Figure 1:
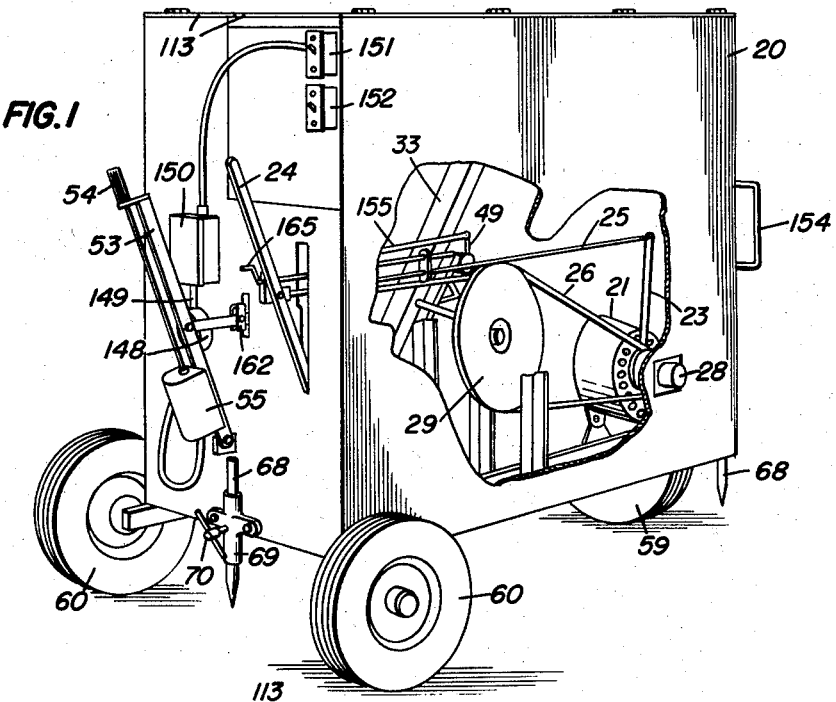

Oct. 13, 1959 — R. L. COOPER — 2,908,266
PITCHING MACHINE
Filed Feb. 21, 1956 — 7 Sheets-Sheet 1

INVENTOR
Roy L. Cooper
BY Walter S. Pawl
ATTORNEY

Oct. 13, 1959  R. L. COOPER  2,908,266
PITCHING MACHINE
Filed Feb. 21, 1956  7 Sheets-Sheet 2

INVENTOR
Roy L. Cooper
BY Walter S. Pawl.
ATTORNEY

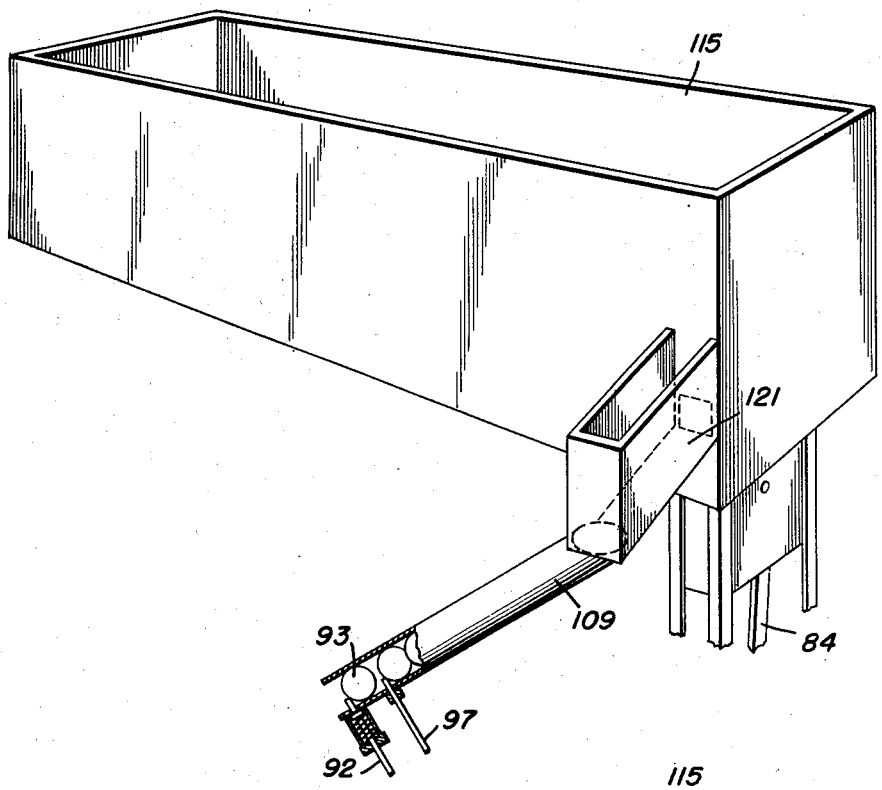
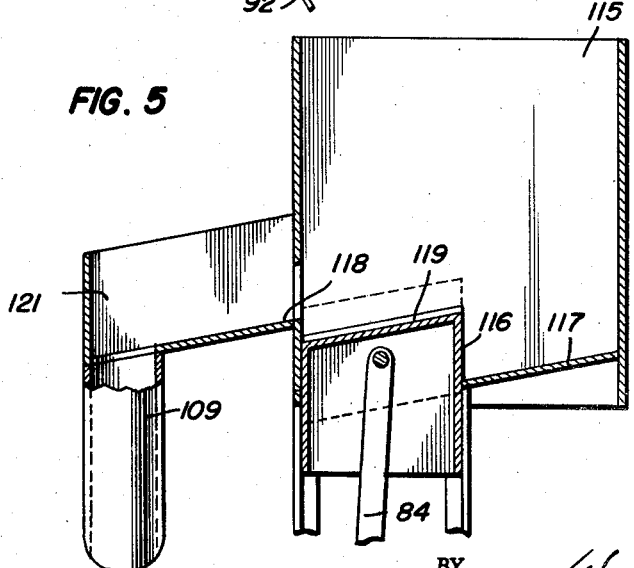

Oct. 13, 1959 R. L. COOPER 2,908,266
PITCHING MACHINE
Filed Feb. 21, 1956 7 Sheets-Sheet 4
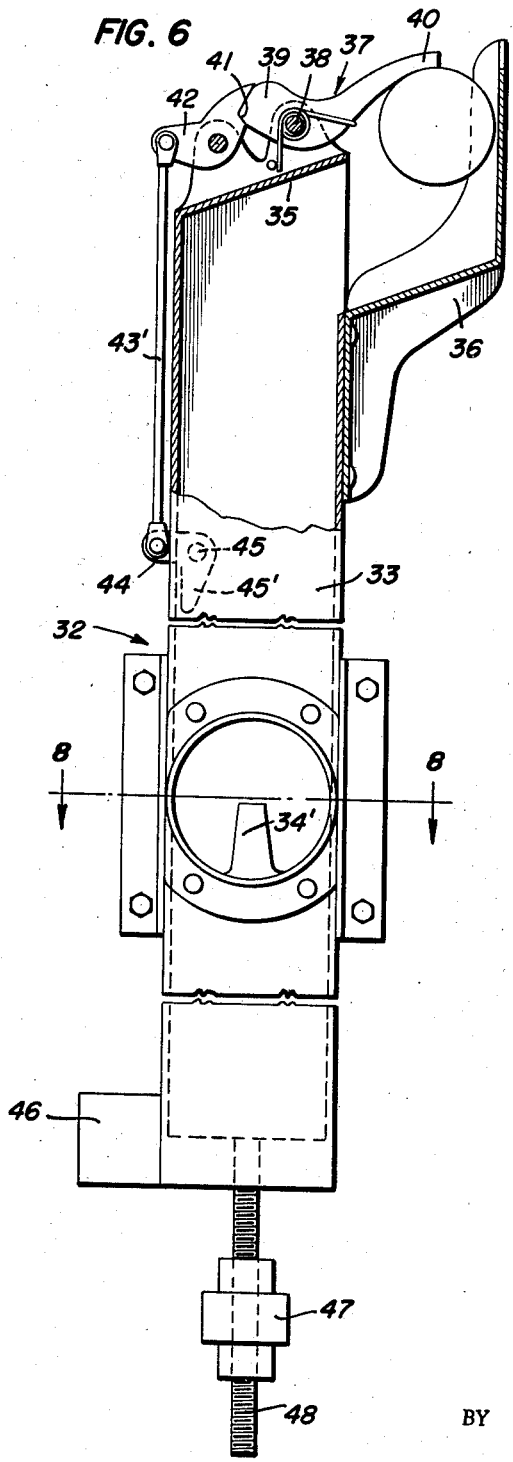
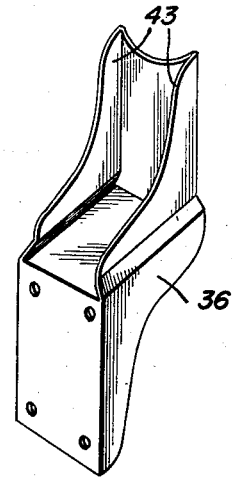
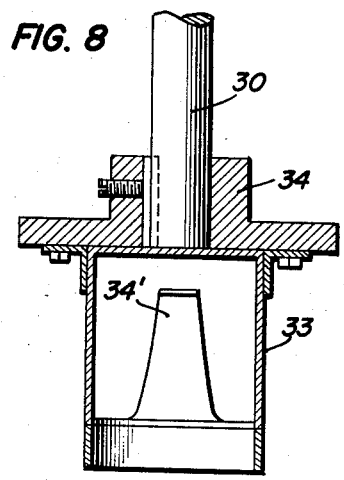
INVENTOR
Roy L. Cooper
BY Walter S. Pawl.
ATTORNEY Oct. 13, 1959    R. L. COOPER    2,908,266
PITCHING MACHINE
Filed Feb. 21, 1956    7 Sheets-Sheet 5
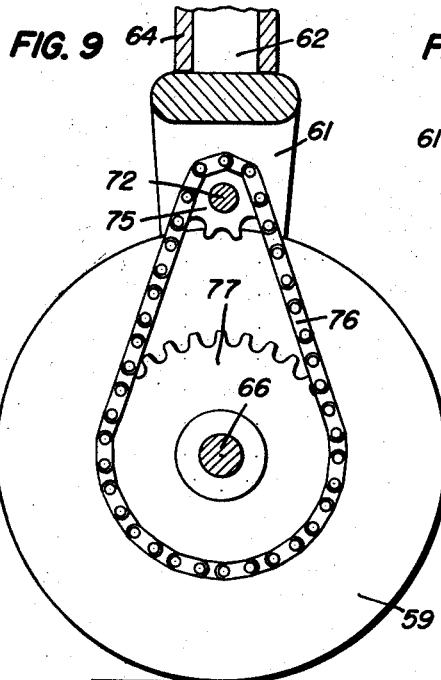
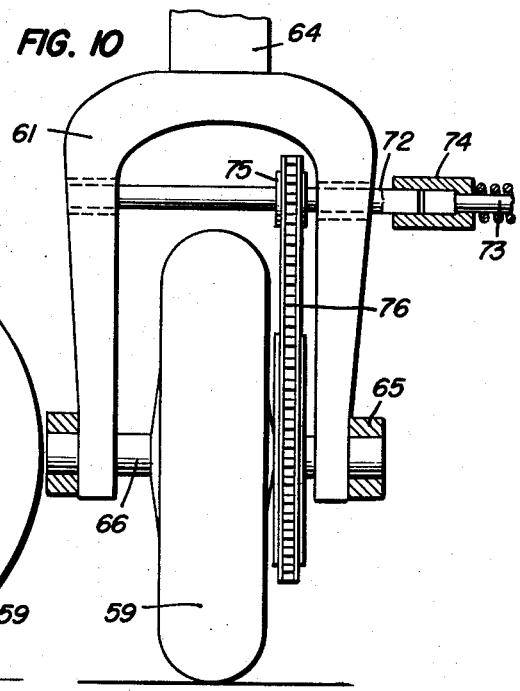
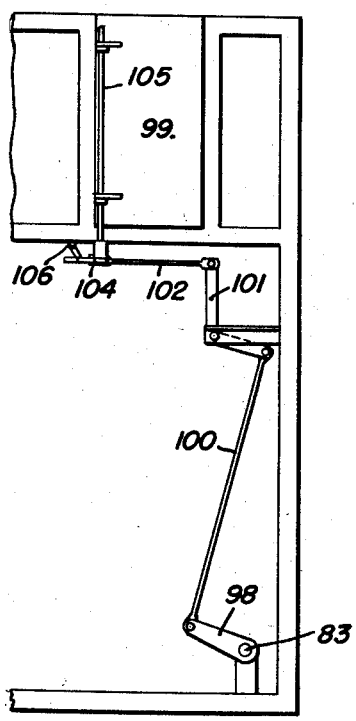
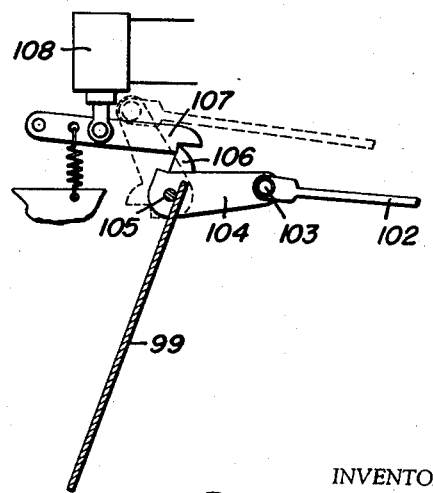
INVENTOR
Roy L. Cooper
BY Walter S. Pawl
ATTORNEY Oct. 13, 1959   R. L. COOPER   2,908,266
PITCHING MACHINE Filed Feb. 21, 1956   7 Sheets-Sheet 6

INVENTOR
Roy L. Cooper

BY Walter S. Paul
ATTORNEY

Oct. 13, 1959 R. L. COOPER 2,908,266
PITCHING MACHINE
Filed Feb. 21, 1956 7 Sheets-Sheet 7

INVENTOR
Roy L. Cooper

BY Walter S. Pawl.
ATTORNEY

United States Patent Office 2,908,266
Patented Oct. 13, 1959

2,908,266

PITCHING MACHINE

Roy L. Cooper, Waterman, Ill., assignor to Waterman Engineering Corporation, Waterman, Ill., a corporation of Illinois Application February 21, 1956, Serial No. 566,807

13 Claims. (Cl. 124—6)

This invention relates to pitching machines for throwing missiles into a target area at a predetermined speed, over a suitably elevated trajectory.

The main object of the present invention is, in general, to provide means for quickly accelerating and ejecting any missile at a desired speed and angle of elevation.

A more specific object is to adapt the above means for use in pitching baseballs for batting practice and for fielders' or catchers' practice in catching flies or grounders as may be desired.

A further object is to build a practical machine of portable type for the above purpose that may be rolled out to the pitcher's mound or any other suitable place in the field wherever its use may be required.

A further object is to make the above machine in a manner that the missile or ball is fed centrifugally along guide members from the center to the extremity of a continuously rotating arm, where it acquires the desired speed, the speed of rotation being controlled by a variable speed drive, release means being provided for letting the missile fly off the end of the arm tangentially at a desired angle of elevation.

A further object is to provide means for controlling the speed of the rotating arm and the point in the cycle of rotation of the arm at which the release means is actuated to control the angle of elevation and speed at which the ball or other missile is pitched.

A further object is to provide separate means for accurately controlling the angle of elevation of the pitch and its speed.

A further object is to provide differential means between the above two control means so that a single control will operate both control means to adjust them for a change in trajectory so as to aim the ball at the same target area regardless of the speed of the pitch, as for example, the batter's strike area over the home plate.

A further object is to provide means for turning the machine laterally to control the direction of the pitch as may be desired.

A further object is to provide means for absorbing the momentum due to the radial speed of a ball accelerated by centrifugal force to the outer end of the arm before delivery to the release finger for release therefrom.

A further object is to provide a ball tank and means for assuring a continuous supply of balls therefrom to the feed chute for individual feeding of the balls one at a time to the rotating arm inlet.

Figure 2:
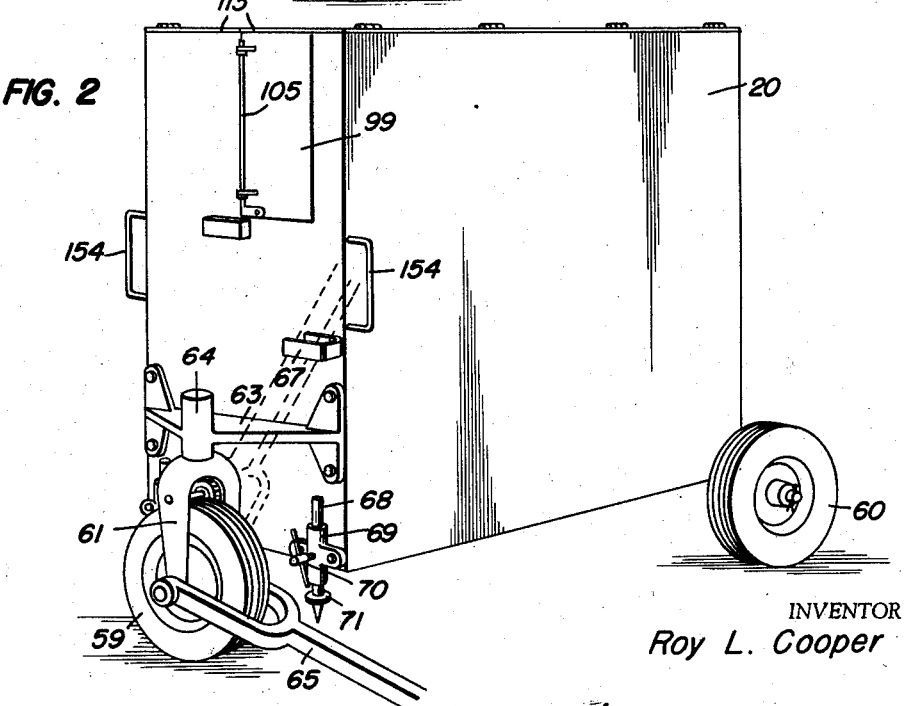
Figure 3:
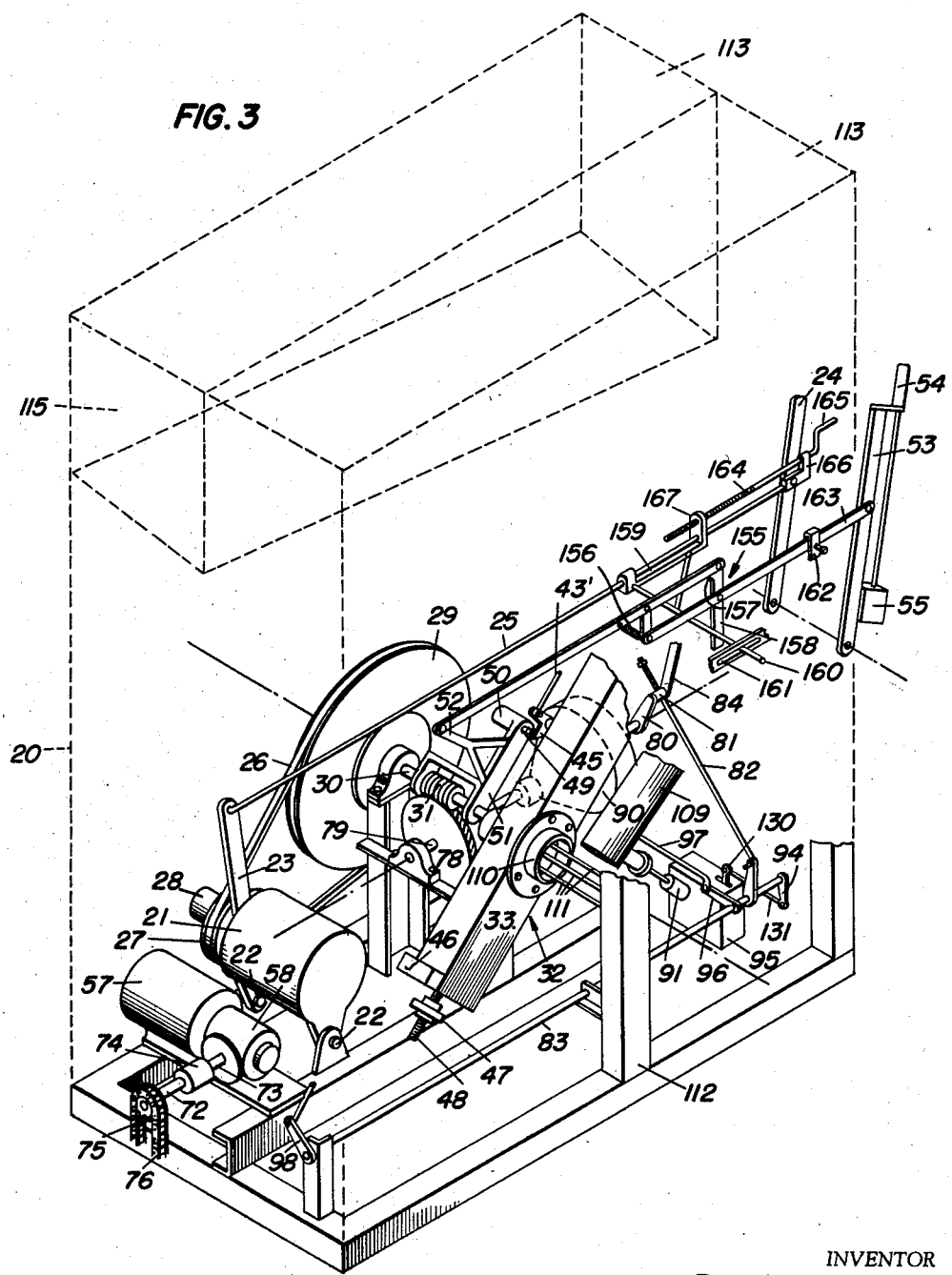
Figure 13:
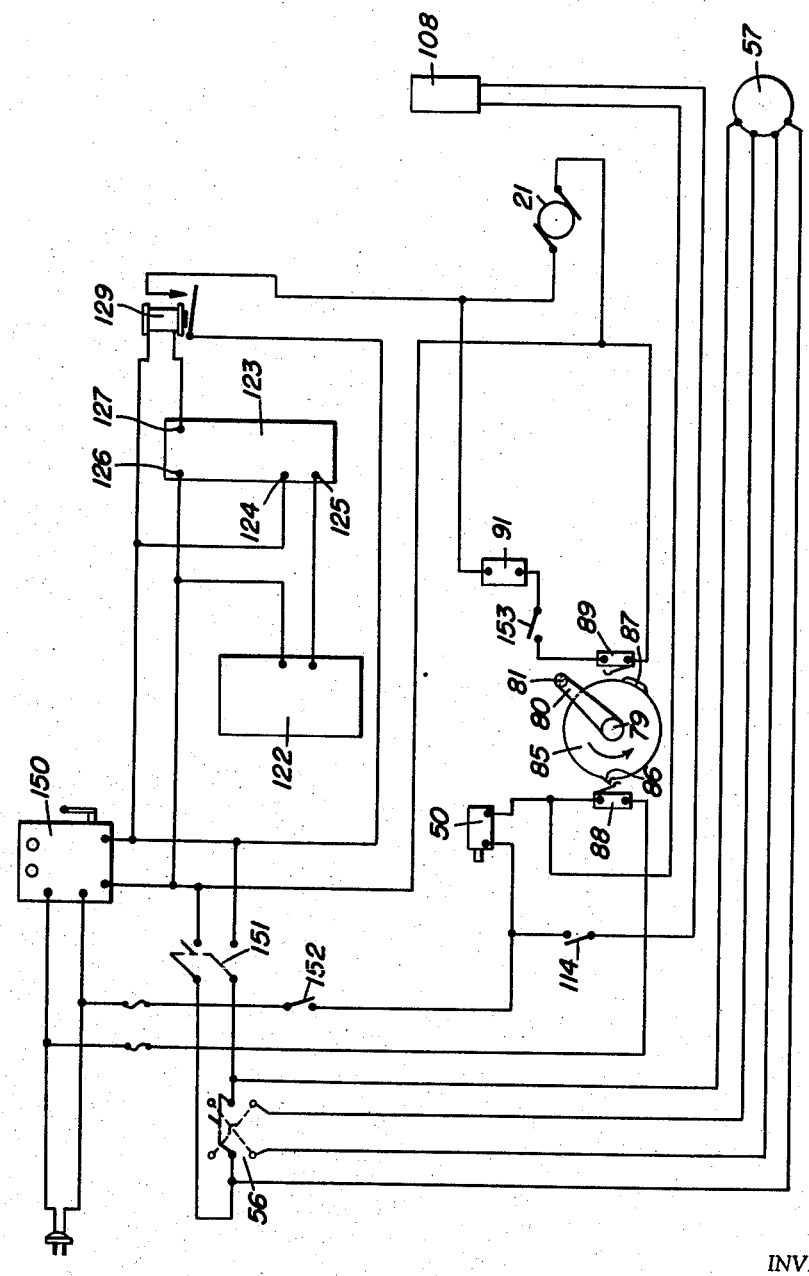
Figure 14:
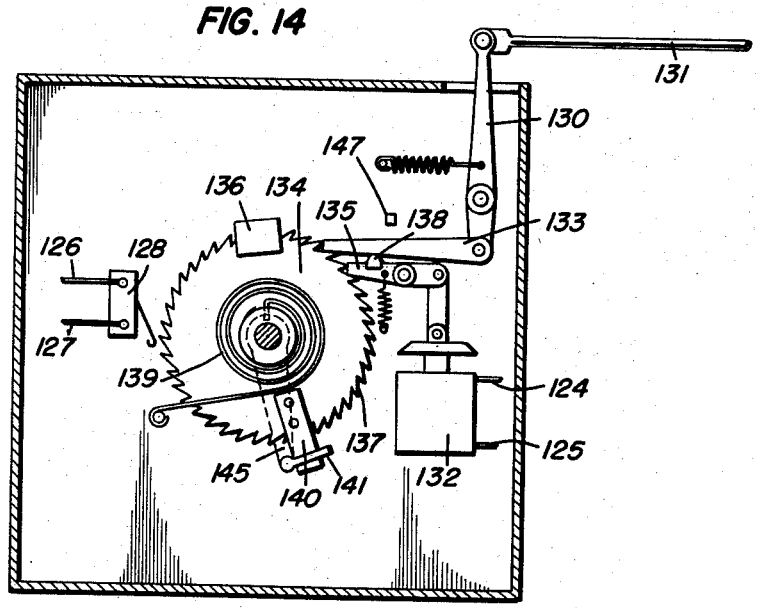
Figure 15:
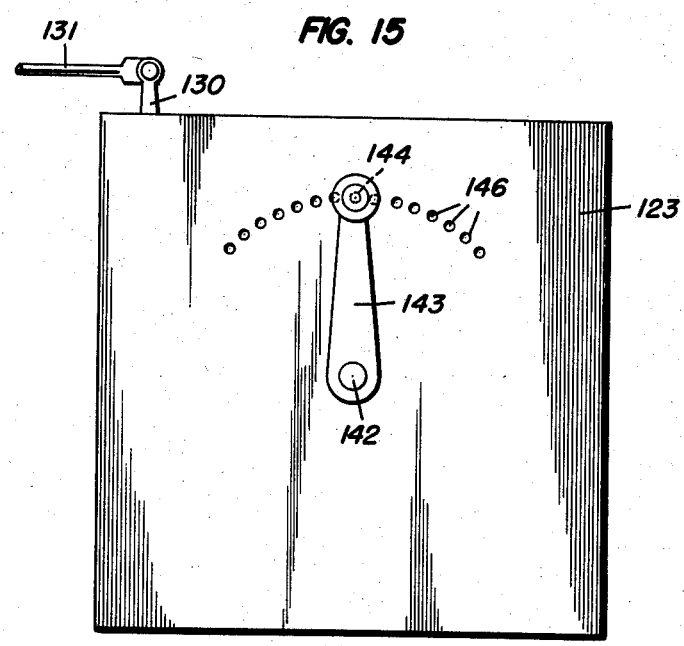

Further and more specific objects will become apparent in the following detailed description of one preferred form of the invention, as illustrated in the accompanying drawings, wherein:

Fig. 1 is a perspective view of the portable baseball pitching machine, showing its rear end, and having its side wall broken away to show some of the essential operating mechanism, Fig. 2 is a perspective view thereof, showing its front end, Fig. 3 is a schematic perspective view of the essential operating parts of the machine, showing their cooperative arrangement, Figs. 4 and 5 are enlarged perspective and sectional views of the ball tank and adjoining ball feeding parts, Fig. 6 is a side view of the rotating arm partly broken away at one end to show the guide path for the ball, Fig. 7 is a perspective view of the offset bracket for reception of the ball before it is released for the pitch, Fig. 8 is a sectional view of the arm taken on the line 8—8 of Fig. 6, Figs. 9 and 10 are two views of the swivelled wheel with its drive connections for turning the front end of the machine about its rear pivot when adjusting the direction of the pitch to be made, Fig. 11 is a detail view of the door and its operative connections for cyclically opening it just before a ball is pitched through the opening, Fig. 12 is a horizontal sectional view through this door looking down on its latching and releasing means, to permit its closure immediately after the ball is pitched, Fig. 13 is a wiring diagram of the control circuits used in this machine, Fig. 14 is an enlarged detail sectional view of a counter mechanism that may be used for cycling the machine to pitch any selected number of balls after each time it is started, and Fig. 15 is a rear view of this counter, showing the adjustable selector control arm.

The form of machine shown in the drawings for purposes of illustration, comprises a box-like enclosure 20 which houses the operating mechanism. A general view of this mechanism may best be seen in the schematic showing of Fig. 3, where the essential operating parts are arranged in accordance with a preferred form of the present invention.

The main source of power for the operation of the present machine is the electric motor 21, which may be any constant speed type. This motor is rockably mounted on pivot lugs 22 and has a rocker arm 23 linked to a speed control lever 24 by means of the rod 25. Operation of lever 24 thus rocks the motor 21 and causes the belt 26 to change the effective radius of pulley 27 which is composed of two discs axially biased toward each other, each disc providing one side of the V-groove for the belt. A coil spring around the outer end of the motor shaft in the housing 28 provides this bias. As the motor is rocked forward, the belt spreads the discs apart against this bias and drives the large fixed pulley 29 off a smaller effective radius of the pulley 27, and hence at a lower speed. When the motor is rocked to the rear, the reverse effect is produced due to the working of the belt outwardly of the pulley 27, permiting the discs to close toward each other, and providing the pulley with a larger effective radius, thus increasing the speed of the pulley 29.

Pulley 29 is fixed to one end of the main shaft 30 which is provided with a worm 31 in its middle portion, and has the rotating pitching arm 32 mounted on its other end. This arm is not fully shown in Fig. 3, but has its pitching end broken away for clarity in showing other cooperating parts.

The rotating arm 32 is shown on a larger scale in detail in Figs. 6, 7 and 8. The arm is composed of a hollow guide member 33 fixed at one side to the shaft 30, by means of a mounting collar member 34 keyed and locked on the shaft. The outer side of the guide member has a circular opening concentric with the shaft 30, and large enough to admit a baseball freely therethrough. This opening may be provided with a surrounding external axially extending inlet flange to receive a ball while the arm is rotating, and guide it into the hollow arm. When a ball is so received, a deflector 34' displaces it off center in the direction of the pitching end of the arm, and thus starts it on its way through this end of the hollow guide member 33, where it gains radial momentum very rapidly because of the high speed of rotation of the arm. At the same time the circumferential speed of the ball is simultaneously increased about the shaft axis, as its radial distance therefrom increases. The ball reaches its maximum radial speed when it strikes the inclined end wall 35 where its radial momentum is absorbed, and the ball is deflected at comparatively low radial speed through the opening in the rear wall at the pitching end of the rotating arm into the hollow of the offset bracket 36, and stops against the normally locked release finger 37. Thus the release finger is protected against excessive stresses which would be caused by the momentum impact of the ball, if it were permitted to fly out directly against the release finger, and this finger mechanism may therefore be made light enough to provide quick response in its release operation and accurate control of the pitch angle. While there still is a considerable centrifugal force on the release finger due to the high rotational speed of the arm, this force does not approach the high impact forces that would be required to stop the high radial speed of the ball as it is flung outwardly, which impact is absorbed in the present instance by the inclined end wall 35.

The release finger is pivoted at 38 and is so balanced thereon that after release it will normally return to its locked position due to the counterbalance portion 39 on the other side of its pivot providing a slightly greater centrifugal force than the ball stop portion 40. When a ball is stationed against this finger portion 40, its centrifugal force is added to that of portion 40 to overbalance the centrifugal force on the other side of the pivot 38 by a comparatively large amount, so that when the finger is unlatched by turning the stop 41 on rocker 42 out of its way, the ball flies out of the hollow of the bracket with insignificant restriction offered by the slightly unbalanced centrifugal forces in the release finger itself.

The offset bracket is provided with side rails 43 which are spaced so that the ball will roll and be guided by them as it leaves the hollow of the bracket.

Rocker 42 is normally biased into interlocked relation with the release finger by centrifugal forces of the linkage connected to its forward end. This linkage includes a pull rod 43' and a bell crank 44 pivoted at 45 to the inner face of the arm 32. This linkage is made as light as possible to overcome inertia stresses during the tripping operation, which will be hereafter described, due consideration being given to required strength. The centrifugal bias of this linkage into latching relation may be supplemented by a spring if deemed desirable.

The crank 44 has a radially inwardly extending arm 45' for receiving a tripping impulse from a striker pin extended into its path at a circumferential point at which the ball will be released at the desired angular phase of the rotating arm in accordance with the required pitch angle. As arm 45' hits the striker pin and then slides over it, it actuates the bell crank to pull the rod 43' and rock the rocker 42 to release the finger 37, and the ball immediately flies out at substantially the circumferential speed of the outer end of the bracket rails 43. The radial distance of this outer end of the bracket rails being fixed, the actual speed of the pitched ball may be readily controlled and ascertained by controlling the rotational speed of the arm 32.

The dynamic balance of the arm charged with a ball ready for release is approximated by mounting a counterweight 46 diagonally opposite the ball and bracket at the other end of the arm 32, and the static balance is provided by an adjustable weight 47 threadedly mounted and locked in balanced position on a threaded stud 48 extending from said other end of the arm. It has been found that by a proper adjustment of these weights substantially all vibrations may be eliminated even at highest speeds of operation.

Referring again now to Fig. 3, it may be seen how a striker pin 49 may be provided, extending from the end of the armature of a solenoid 50, which is energized for an instant to extend the striker pin into the path of the arm 45. The solenoid 50 is mounted on an arm 51 pivotally supported on the shaft 30 by means of a bearing frame or yoke straddling the worm 31. A bracket 52 on the arm 51 is linked to a control lever 53, which serves to manually control the pitch angle. Lever 53 has a grip handle 54 which is rotatably mounted on the lever 53 and has a shaft extending downwardly to a switch box 55, where it is connected to a rotary reversing switch 56 for controlling the operation of reversible motor 57 mounted in the forward part of the enclosure. The motor 57 has a reduction gear 58 for driving the front wheel 59 to turn the machine to the left or right to change the direction of pitching, as may be desired, by twisting the grip handle 54 in the corresponding direction from neutral.

Where portability and directional control are desired in this machine, it may be mounted preferably on wheels arranged as shown in Figs. 1 and 2. A pair of wheels 60 may be mounted on fixed transverse axes at the rear corners of the machine, and one wheel 59 swivelled on a vertical axis at the front of the machine. This wheel 59 is mounted in a vertical fork member 61, which has a vertical pin 62 on top, cooperating with a bearing on bracket 63 mounted on the front wall of the enclosure 20, to provide a swivel 64.

A forked draw-bar or handle 65 is pivoted to the opposite ends of the wheel axle 66, whereby the machine may be hauled out into the field and moved whenever desired. When pulled up into a desired position, the handle is raised, and its shank is moved into a spring clamp or other holding means 67 on the front wall of the machine until ready to move the machine to another position. In order to avoid accidental displacement or creep of the machine during operation, the machine may be anchored in position by three anchor pins 68, one at each corner at the front end and one in the middle at the rear end. These pins are slidably mounted in vertical sleeves 69, each provided with a lock screw 70 for fixing the pin in any position in the sleeve. To anchor the machine, lock screws 70 are loosened to free the pins, and each pin is then driven into the ground and the screws retightened. The pins 68 may be provided with flanges 71 a suitable distance from the lower pointed end, and the pins tapped into the ground, up to this flange.

For the purpose of adjusting the direction of pitching, the front wheel is swivelled around until it is substantially at right angles to the longitudinal axis of the machine, with the drive shaft 72 extending to the rear in alignment with the drive coupling on the exposed end of the driving shaft 73, extending forward from the reduction gear 58. In this position the shafts are connected together by releasing the biased coupling 74 over the squared ends of both shafts 72 and 73. It will be noted that shaft 72 is rotatably mounted in the fork 61 above the wheel 59 and carries a small sprocket 75 keyed thereto. A drive chain 76 connects this sprocket with a larger sprocket 77 fixed to the wheel 59. The pins 68 at the forward corners of the machine are locked in raised position, but the one at the rear is driven into the ground and provides a pivot about which the machine turns during directional adjustment. As already mentioned, the grip handle 54 is used not only to operate the lever 53 for controlling the pitching angle, but also serves as the reverse switch handle for directional control, which is obtained by the operation of the motor 57 to drive the wheel through coupling 74 and the chain and sprocket connection, in either direction.

The worm 31 drives a worm wheel 78 at reduced speed, to turn the slow speed shaft 79 one revolution in not less than the minimum time required between successive pitches, because this shaft drives the cyclic controls in proper sequence during each interval between throws. A judicious selection of the gear ratio for this worm and gear is therefore necessary and will depend in a large measure on such considerations as the length of the pitching arm, the range of pitching speeds to be used, the minimum interval desired between pitches of the speediest balls, etc.

For baseball throwing in the speed ranges of about 40 to 90 mis. per hr., with a 24" pitching arm, it has been found that a 50 to 1 gear reduction ratio gives one a reasonable time interval per cycle. However, for lower average speeds of pitching and longer pitching arms, lower gear ratios may be more desirable, so as not to prolong the intervals too much.

The present slow speed shaft 79 extends horizontally to the rear from worm wheel 78. At is rear end is a crank arm 80 having a rotatably mounted crank pin 81 thereon. The crank pin 81 has a connecting rod 82 slidably passed therethrough and having a threaded end to accommodate an adjustable stop nut for cooperation with the crank pin 81 to operate the rod 82 and its connected rocker shaft 83 over a limited portion of its circumferential travel by providing lost motion in the connection during the rest of this travel. The crank pin 81 is at the same time connected to a reciprocating ball feeding part through connecting rod 84 without any lost motion.

Mounted on an intermediate portion of the slow speed shaft 79 is a cam 85 with two lobes 86 and 87 for operating the normally opened micro-switches 88 and 89 respectively, in timed sequence with each other and with the crank arm 80, so as to give a very short impulse to the stricker solenoid closing switch 88 for only a portion of one revolution of the main shaft 30, so as not to accidentally trip the release mechanism more than once in one cycle of the slow speed shaft.

The switches are supported on a stationary plate alongside of the cam 85 and extend into the planes of operation of their respective cam lobes, and a bell housing 90 is mounted over this plate and cam to protect the parts against accumulation of dirt. The mounting of the switch 88 operated by cam lobe 86, may be made adjustable in order to provide the required fine timing of the projection of the striker pin 49 into the path of the arm 45 for the proper time interval, when the pitching arm is within the corresponding phase range.

The other cam lobe 87 is somewhat more extended to provide a sufficiently long interval after switch 89 has closed to energize solenoid 91 and to hold the ball stop 92 withdrawn until the ball 93 has had time to roll down and clear this stop, so as to avoid possible jamming of the stop against the ball, if the stop is released too soon.

The rocker shaft has several cranks fixed to it at suitable angles to perform different functions. Crank 94 at the rear end extends downwardly and is connected to the counter 95. Crank 96 extends inwardly and is connected to the ball stop rod 97 for withdrawing it from the chute, to advance the row of balls above it down to the stop 92, which has previously released the lowermost ball 93. Crank 98 is positioned to open the normally closed door 99 into latched open position through the link 100, bell crank 101 and link 102. This linkage is connected at 103 to a crank 104, which is integral with or rigidly fixed to the door 99 and door hinge rod 105 and has an offset lug 106 in the plane of the spring biased latch lever 107. As the door 99 is opened, the offset end of the lug 106 engages the edge of the latch lever and pushes it against its spring bias until it reaches the stepped portion near the end of the latch lever, as the door is fully opened, when the lever latches its stepped portion over this lug and thus keeps the door open until the door latch release solenoid 108 is energized by operation of the same switch 88 that energizes the striker pin solenoid 50. However, whereas the striker pin actuation is almost instantaneously accompanied by the discharge of the pitched ball, the door latch release solenoid has a slight lag in its operation because of the drag on the latch parts, and the inertia of the door itself and its air resistance tend to delay its closing sufficiently to provide ample time for the ball to shoot out of the door opening before the door starts to close.

Between the chute 109 and the inlet flange 110 on the rotating arm 32, the ball is guided by an open inclined passageway formed between a series of parallel rods 111 extending from the frame stud 112 to within a small clearance from the periphery of the inlet flange 110. When the ball is dropped from the chute into this passageway, it rolls down without restriction straight into the center of the rotating arm.

The enclosure 20 has a pair of flap doors 113 over the top, hinged along the sides and meeting along the middle. When it is desired to throw some high elevation balls, the top door 113 on the left side is lifted and turned over the side, the front door 99 is opened to latched position, and the manual switch 114 may be opened to prevent the release of this door. There being no frame work in the corner of the enclosure where the doors 99 and 113 meet when closed, no obstruction is left overhead or forward in the plane of rotation of the rotating arm 32, so that the balls may be pitched at any angle of elevation without restriction by structural elements.

In the right half of the upper part of the enclosure 20, a ball tank or reservoir 115 may be set apart with an inclined floor slanting downwardly toward the rear end. A chute may be connected between this end at the bottom of the tank and the chute 109. However, to avoid bridging of the balls over the outlet from the tank, various agitating means have been used heretofore. It has been found, however, that a simple mechanically operated platform piston such as 116 may be reciprocated up and down by means of the connecting rod 84 cyclically, to act as an elevator for raising a row of three balls, or any other number, from the lowest level 117 in the tank to the level of an outlet chute 118 on an inclined grooved platform 119 into line with the inclined chute 118 where one or more of the balls would roll into the chute to fill it up. This platform operation serves both to break up intermittently any tendency of the balls to bridge, and to facilitate the use of large capacity tanks extending to lower levels to use up available space there, by providing means for raising all the balls, to the last one in the tank, from its bottom up to the top of the feeding chute.

The wiring diagram in Fig. 13 includes a coin operated circuit, showing how it could be applied to the present machine. The coin box 122 is connected to operate a reset solenoid 132 in the counter-switch 123, through the terminals 124 and 125, upon insertion of the proper coin. This also closes normally closed micro-switch 128 in the counter-switch assembly. Micro-switch 128 closes the connection between terminals 126 and 127 and completes the circuit to the relay switch 129 to start the operation of the machine.

During the pitching operation fo reach ball, the rocker 94 operates the lever 130 in the counter-switch assembly by pulling on the link 131. The pawl 133 is thus pushed to advance the ratchet 134 one tooth under the spring pressed pawl 135. When the cam block 136 reaches the switch arm of micro-switch 128, the relay circuit is broken and the machine comes to a stop.

When a proper coin is deposited, the reset solenoid 132 lifts the pawl 135 out of engagement with the teeth 137 of the ratchet 134, and the lobe 138 on pawl 135 in turn lifts the pawl 133 likewise off the ratchet. The ratchet being normally biased by coil spring 139 in a clockwise direction, turns in that direction freely until its lug 140 strikes the stop which may be in the form of a spring clip 141 to prevent rebound. This stop is mounted on an arm fixed to shaft 142 on which the ratchet 134 is rotatably mounted, and extends outside of the counter-switch housing where it has a fixed arm 143 with a spring pressed pin 144 which locks the arm in any one of a number of angular positions to permit adjustment of the number of balls to be fed during one cycle of operation of the machine when reset by dropping a proper coin in the coin box. In the illustration in Fig. 14, the counter has just been reset and there appear to be 8 ratchet teeth between the switch arm of the microswitch and switch cam 136, which indicates that the stop had been set for a cycle of eight balls. It is obvious that the pin holes 146 may be spaced so as to correspond to a change by one in the number of balls to be fed in one cycle for each adjustment of the arm 143 between adjacent pin holes. In other words, the angular spacing of pin holes 146 may be equivalent to the angular pitch of the ratchet teeth 137.

A stop 147 for the pawl 133 may be provided to limit the extent of lift of the pawls by the solenoid 132.

The switch cam 136 is made long enough to extend over the distance of at least two ratchet teeth, in order to avoid the possibility of its moving past the switch before the machine comes to a stop, thus undesirably restarting the motor operation.

The supply of electric current, especially for the portable type of machine illustrated, may be obtained by an extension cord from a standard 110 v. A.-C. supply source through a female plug applied to the male plug fitting 148 mounted on the back of the enclosure 20. This fitting is connected by cable 149 through the fuse box and main control switch 150 to the several circuits in accordance with the wiring diagram of Fig. 13. The two switches 151 and 152 shown on the back of the enclosure 20 are manual switches, respectively, for turning on the reversing motor control circuit and for disconnecting the tripping circuit to disable the solenoid 50 and postpone operating the ball release mechanism while running the machine, without throwing balls, for check purposes, etc. Other switching arrangements may be provided as may be desired. For example, a manual switch 153 may be provided in the ball dropping circuit to stop feeding the balls by opening the switch when desired. A manual switch between the terminals 126 and 127 might be desirable for operation without the coin operated controls and counter. A good place for the coin box 122, where coin operation is desired for batters' practice, would normally be somewhere near the batter's box.

As shown in Figs. 1 and 2, a pair of loop handles 154 may be provided at the sides of the rear end of the enclosure 20 to facilitate handling the machine in moving it around the field.

It may be desirable for some purposes, as in case of pitching balls at different speeds, to simultaneously automatically adjust the angle of pitch in accordance with the speed adjustment to assure delivery of the balls through the same target area. It is a well recognized law of nature that a slow pitched ball requires a higher angle of elevation of the pitch than a faster ball, because the curve of its trajectory is necessarily higher than that of the faster ball, which more nearly approaches a horizontal line of travel the faster the pitch. But to properly coordinate the movements of the angle and speed control levers 24 and 53 without trial and error may be a little difficult except after sufficient practice. However, the present disclosure shows a manner of correlating these controls so that after proper adjustment of the interconnecting parts, the operation of the speed control lever 24 alone will automatically adjust the angle of throw so that the target area at which the ball is aimed, will be substantially unchanged regardless of the speed adjustment. Yet, if desired, the angle control lever 53 may be independently moved to override the interconnection at any time.

To obtain this correlation, the connecting link in the angle control between the lever 53 and the bracket 52 includes a pantograph linkage 155 for proportioning the adjustment of the angle control with that of the speed control, in response to the movement of the latter, so as to maintain the successive balls pitched on the same target. A spring 156 biases the parallelogram in substantially rectangular form normally, and an angle stop lug 157 is provided in one of the corners of the parallelogram to limit the normal foreshortening of the overall connection between the lever 53 and the bracket 52 due to the spring bias. One of the vertical side members 158 of the parallelogram is extended downwardly to provide a lever. A bracket 159 slidably supported on link rod 25 has an arm 160 extending transversely in front of lever 158. Arm 160 has its end slidably guided in a slot 161 substantially parallel to the movement of link rod 25, so that the latter movement may be transmitted to lever 158 in proper proportion when the speed control lever 24 is pulled back and causes arm 160 to push the lever 158 and moves the angle control bracket 52 forward a proportionate amount while the lever 53 is set in a stationary position by a clamp 162 tightened over the link portion 163 directly connected to it.

A threaded rod 164 with a crank handle 165 is rotatably mounted in, and axially restricted by, a collar bearing 166 at the lever end of link rod 25, and is threadedly engaged with an ear 167 on the slidable bracket for axially adjusting the position of bracket 159 on the link rod 25 to adjust the relative positions of the speed and angle controls when arm 160 and lever 158 are in contact, with the lever 53 clamped in a predetermined position.

The desired relative adjustment is obtained by first clamping the lever 53 in some definite position by means of clamp 162, after adjusting both controls to reach the desired target area with a low speed ball. Then while retaining the lever 24 stationary, preferably by clamping it in that position, the bracket 159 is adjusted by turning the crank handle 165 until arm 160 just contacts lever 158. Then the lever 24 may be moved to increase the speed of throw of the ball any amount, and the angle of throw will be automatically reduced a proportionate amount to maintain trajectory of the succeeding balls in the target area. Thus, a simple manipulation of the speed control lever 24 will thereafter automatically adjust the corresponding angle of elevation of the pitch to hit the target area with any speed of pitch. It has been found that this type of interconnection can be made very sensitive and accurate in maintaining the correct relations between the controls so as to maintain average errors in placing successive balls in the same target area of the order of less than six inches, for pitching over home base from the pitcher's position on a standard ball diamond.

While a portable type machine is here illustrated, it is to be understood that portability is not required in places such as amateur practice fields, where the machine may be permanently installed, and in many such cases, a ball tank or reservoir common to a number of machines may be arranged to feed balls to each one.

Also, while one specific form and arrangement of parts are here shown, for purposes of illustration, many obvious modifications therein may be made without departing from the spirit and scope of this invention, as defined in the appended claims.

For example, the machine may be adapted to pitching soft-ball, and may in that event be made to throw "underhand," i.e. by a reverse rotation of the throwing arm, and a release of the ball therefrom during the lower swing of its rotation.

Furthermore, different values of rotational speed of the arm and its radial length may be selected to obtain desirable linear speeds of the released missile, be it baseball, soft-ball, mortar shell, or any other guided or unguided missile.

The primary advantages of this machine have already been mentioned, but it is well to repeat that the arrangement of parts and methods of operation used are such that extreme accuracy in control of the missile's speed, angle of elevation and direction may be obtained, and the controls may be so correlated that the angle may be automatically adjusted in response to adjustment of the speed to maintain successive missiles thrown at different speeds, on the same target area.

The machine may be finely balanced both dynamically and statically to reduce shock and consequently wear to a minimum.

What is claimed is:

1. A ball pitching machine comprising a hollow radially extending and continuously rotating, and substantially balanced pitching arm, rotating in a vertical plane on a horizontal axis of rotation and having an axial opening in its side for the reception of a ball into the hollow of the arm, said hollow forming a guide passage for the centrifugally driven ball to the radial extremity of said arm, means at said extremity for absorbing the radial impact of said ball, releasable stop means adjacent said impact absorbing means for receiving said ball from said impact absorbing means and releasing the ball for a free flight pitch from said extremity at a predetermined point in its orbit to determine the precise angle of the pitch, trigger means having a tripping lever at the side of said arm for releasing said stop means, a striker pin angularly adjustable about said axis and extendable into the path of said tripping lever to operate said trigger means at a precise angle within the range of its angular adjustment, said impact absorbing means for said ball comprising an outer end wall for said guide passage, said end wall being slightly inclined toward said adjacent stop means.

2. A base-ball pitching machine, comprising a hollow, radially extending, continuously rotating and substantially dynamically balanced pitching arm, rotating in a vertical plane on a horizontal axis of rotation and having an axial opening in its side for the reception of a ball into the radial hollow of the arm, said hollow forming a guide passage for the ball to the radial extremity of said arm, a deflector in said opening to displace the ball radially into said hollow, means at said extremity comprising an outer end wall for said guide passage for absorbing the radial impact of the centrifugal momentum of said ball, releasable stop means adjacent said impact absorbing means for receiving said ball from said impact absorbing means, said end wall being inclined toward said stop means, and means for releasing the ball for a free flight from said extremity at a predetermined point in its orbit, to determine the precise angle of elevation of the pitch, said releasing means comprising trigger means having a tripping lever at the side of said arm for releasing said stop means and a striker pin angularly about said axis and extendible into the path of said tripping lever to operate said tripping lever at a precise angle within a range of its angular adjustment.

3. A ball pitching machine as defined in claim 2, a rockably mounted constant speed motor with a variable diameter pulley connected to drive said pitching arm, means for rocking said motor to adjust the speed of rotation of said arm to control the speed of the pitch, and means for angularly adjusting said striker pin to precisely control the angle of the pitch.

4. A ball pitching machine as defined in claim 3, an enclosure for said machine, a vertically elongated port in front of said enclosure for the pitched balls to pass through, said port being extended uninterruptedly rearward over the entire length of the top of said enclosure, and a flap door for said port extension hinged to the side of said enclosure so that it may be opened by lifting and turning it over to hang over said side.

5. A ball pitching machine as defined in claim 4, a pair of wheels on fixed transverse axles under one end of said enclosure, and a swivelled wheel supporting the other end of said enclosure.

6. A ball pitching machine made portable as defined in claim 5, and a pulling handle pivoted by means of a forked end to the ends of its axle for pulling the machine around the field, and anchor pins slidably mounted in vertical sleeves at the bottom of said enclosure, said sleeves having set screws for locking their respective pins in either anchored or raised positions.

7. A ball pitching machine as defined in claim 6, said enclosure having means on its end wall for receiving said handle when not in use, this being the front end, two of said anchor pins being mounted near the front corners of said machine, and a third at the rear thereof substantially midway between said pair of wheels, reversible drive means for connection to said swivelled wheel to rotate the same when turned transversely of said machine, and manual control means for selectively operating said reversible drive means in either direction to rotate said swivel wheel to pivot said throwing machine about said third pin while said third pin is anchored down in the ground.

8. A ball pitching machine as defined in claim 7, said speed adjusting and striker pin adjusting means including two levers at the rear of the machine, said speed adjusting lever serving to control the speed of rotation of the pitching arm and said striker pin adjusting control lever serving to determine the angle of the pitch by changing the position of the striker pin about said axis, said striker pin adjusting control lever having a rotatable handle, the rotation of which serves as the manual control means to selectively operate said reversible drive means.

9. A ball pitching machine as defined in claim 3, and means for correlating the said two adjustments so that operation of the speed control adjustment automatically adjusts the angle control to maintain successive balls on target.

10. A ball pitching machine as defined in claim 3, a guide chute for delivering balls to said axial opening, and means for cyclically releasing one ball at a time from the end of said guide chute to said opening.

11. A ball pitching machine as defined in claim 3, a shaft for mounting said arm, a pulley fixed to said shaft, said motor pulley being a split V-groove pulley on said motor with spring pressure for urging the split sides of said groove together, a V-belt connecting said pulleys, and said means for rocking said motor serving to rock the same about an eccentric hinge to vary the distance between pulleys, whereby the belt will work inwardly on a smaller diameter in the split groove to reduce the speed of the other pulley when said distance is increased, said rocking means being a part of said speed adjusting means.

12. A ball pitching machine as defined in claim 11, said means for angularly adjusting said striker pin comprising an arm pivoted on said shaft with said striker pin being axially slidable in an end of said arm, said tripping lever comprising a bell crank pivoted on the inner face of said arm connected to said releasable stop means, said releasable stop means including a release finger at the pitching end of said arm, said bell crank having an arm extending radially inward at the same radius about the shaft as said striker pin, and means for extending said striker pin into the path of said bell crank arm to operate said release finger, said striker pin extending means being mounted on said angularly adjustable arm for controlling the pitch angle.

13. A baseball pitching machine comprising a continuously rotating pitching arm, rotating in a vertical plane and mounted on a horizontal axis passing substantially through its dynamical center, guide means in said arm having a ball inlet in its side at its center for guiding the ball to one end of the arm, radial impact absorbing means comprising an end wall at the outer end of said guide means for the ball when it reaches said end, releasable stop means for retaining the ball in said end, adjacent said impact absorbing means, said end wall being inclined toward said stop means, and adjustable control means for operating said releasable means to release the ball in free flight at a desired angle of release in said vertical plane of rotation to determine the precise angle of pitch.

References Cited in the file of this patent

UNITED STATES PATENTS

| | | |
|---|---|---|
| 21,109 | Thayer | Aug. 3, 1858 |
| 526,775 | Foster | Oct. 2, 1894 |
| 540,318 | Jenkins | June 4, 1895 |
| 910,794 | Deport | Jan. 26, 1909 |
| 1,198,300 | Watkins | Sept. 12, 1916 |
| 1,284,999 | Blair | Nov. 19, 1918 |
| 1,332,992 | Moore et al. | Mar. 9, 1920 |
| 2,425,563 | Riboud | Aug. 12, 1947 |
| 2,690,169 | Emilian | Sept. 28, 1954 |
| 2,696,204 | Gilgoff | Dec. 7, 1954 |

FOREIGN PATENTS

| | | |
|---|---|---|
| 175,687 | Great Britain | Feb. 20, 1922 |
| 239,616 | Great Britain | Sept. 16, 1925 |
| 675,287 | France | Oct. 29, 1929 |